(12) United States Patent
Fuchs et al.

(10) Patent No.: US 10,603,648 B2
(45) Date of Patent: Mar. 31, 2020

(54) METHOD FOR ARRANGING A PACKING IN A BURNER AND BURNER BASKET FOR A BURNER

(71) Applicants: ThyssenKrupp Industrial Solutions AG, Essen (DE); thyssenkrupp AG, Essen (DE)

(72) Inventors: Jürgen Fuchs, Dortmund (DE); Klaus Ruthardt, Dortmund (DE); Rolf Siefert, Rheda-Wiedenbrück (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 167 days.

(21) Appl. No.: 15/537,540

(22) PCT Filed: Dec. 17, 2015

(86) PCT No.: PCT/EP2015/080315
§ 371 (c)(1),
(2) Date: Jun. 19, 2017

(87) PCT Pub. No.: WO2016/102324
PCT Pub. Date: Jun. 30, 2016

(65) Prior Publication Data
US 2017/0348660 A1   Dec. 7, 2017

(30) Foreign Application Priority Data
Dec. 22, 2014   (DE) .................. 10 2014 226 791

(51) Int. Cl.
*F23D 14/12*   (2006.01)
*B01J 8/04*   (2006.01)
(Continued)

(52) U.S. Cl.
CPC .............. *B01J 8/0434* (2013.01); *B01J 8/02* (2013.01); *C01B 21/28* (2013.01); *F23C 99/006* (2013.01);
(Continued)

(58) Field of Classification Search
CPC .... B01J 8/008; B01J 2208/00672; B01J 8/02; B01J 8/0434; F23C 13/00; F23C 99/006; C01B 21/32
See application file for complete search history.

(56) References Cited

U.S. PATENT DOCUMENTS 3,038,790 A * 6/1962 Beggs ................. B01D 53/26
                                                     261/97
3,090,667 A   5/1963 Connellan
(Continued)

FOREIGN PATENT DOCUMENTS

DE       4322109 A    1/1995
DE   102011112782 A   3/2013
(Continued)

OTHER PUBLICATIONS

English translation of International Search Report issued in PCT/EP2015/080315, dated Feb. 25, 2016 (dated Mar. 7, 2016).
English Abstract for JP 2003-302012A.

*Primary Examiner* — Jason Lau
(74) *Attorney, Agent, or Firm* — thyssenkrupp North America, Inc.

(57) ABSTRACT

A method for disposing a bed comprising particles in a burner through which a gas can flow, more particularly in a burner basket of an ammonia oxidation burner, where the particles are disposed such that the bed has a greater flow resistance in an edge region of the burner than in an inner region of the burner. Further, a burner basket for a burner may have a bed comprising particles, wherein the particles
(Continued)

are disposed such that the bed has a greater flow resistance in an edge region of the burner basket than in an inner region of the burner basket.

16 Claims, 6 Drawing Sheets

(51) Int. Cl.
    *C01B 21/28*     (2006.01)
    *F23C 99/00*     (2006.01)
    *B01J 8/02*     (2006.01)

(52) U.S. Cl.
    CPC ............ *B01J 2208/0084* (2013.01); *B01J 2208/00672* (2013.01); *B01J 2208/00814* (2013.01); *B01J 2208/00884* (2013.01); *B01J 2208/025* (2013.01); *F23D 2900/14581* (2013.01); *F23D 2900/14582* (2013.01)

(56) References Cited

U.S. PATENT DOCUMENTS

| | | | | |
|---|---|---|---|---|
| 4,189,294 | A | * | 2/1980 | Rice .................. F23C 13/00 126/39 J |
| 5,262,012 | A | * | 11/1993 | Smith, Jr. ............ B01D 3/009 202/158 |
| 5,522,723 | A | | 6/1996 | Durst |
| 7,666,367 | B1 | * | 2/2010 | Durst .................. B01D 53/34 422/211 |
| 2015/0209754 | A1 | | 7/2015 | Fuchs |

FOREIGN PATENT DOCUMENTS

| | | |
|---|---|---|
| EP | 1022056 A | 7/2000 |
| JP | 2003302012 A | 10/2003 |
| WO | 99/20384 A | 4/1999 |
| WO | 2005018792 A | 3/2005 |
| WO | 2013034303 A | 3/2013 |

* cited by examiner

METHOD FOR ARRANGING A PACKING IN A BURNER AND BURNER BASKET FOR A BURNER

CROSS REFERENCE TO RELATED APPLICATIONS

This application is a U.S. National Stage Entry of International Patent Application Serial Number PCT/EP2015/080315, filed Dec. 17, 2015, which claims priority to German Patent Application No. DE 10 2014 226 791.9 filed Dec. 22, 2014, the entire contents of both of which are incorporated herein by reference.

FIELD

The present disclosure generally relates to burners, ammonia oxidation burners, burner baskets, and methods for arranging beds consisting of particles in burners and in burner baskets of ammonia oxidation burners.

BACKGROUND

Ammonia oxidation burners are used in the synthesis of nitric acid, for example. In that case ammonia ($NH_3$) and oxygen ($O_2$) are reacted catalytically to form nitrogen monoxide (NO) and water ($H_2O$) in the ammonia oxidation burner. The NO obtained is then used further for preparing nitric acid.

Catalysts used in ammonia oxidation burners are customarily platinum/rhodium gauzes, which are placed on a bed consisting of particles. The particles generally are designed as packing elements made of stoneware, glass, porcelain or stainless steel, and are introduced into a burner basket arranged within the burner. The burner basket customarily has a gas-permeable bottom plate, allowing the $NH_3$ introduced into the burner to flow through the burner basket and through the bed.

The oxidation of ammonia in the burner requires an operating temperature of about 890° C. at a pressure of about 10 bar. Owing to the high temperature, in operation of the ammonia oxidation burner, the burner basket undergoes expansion. An observation here is that the bottom plate of the burner basket expands with a delay in comparison to the side walls of the burner basket. On repeated start-up and run-down of the ammonia oxidation burner, these differences in expansion characteristics between burner basket side walls and bottom plate result in development of cavities and cracks in the bed in the edge region of the burner basket. This destruction of the bed structure reduces the flow resistance for the permeating stream of $NH_3$, and the catalyst gauzes are no longer supported uniformly by the bed. These phenomena give rise to a loss of combustion efficiency and to ammonia slip.

DETAILED DESCRIPTION

Figure 1:
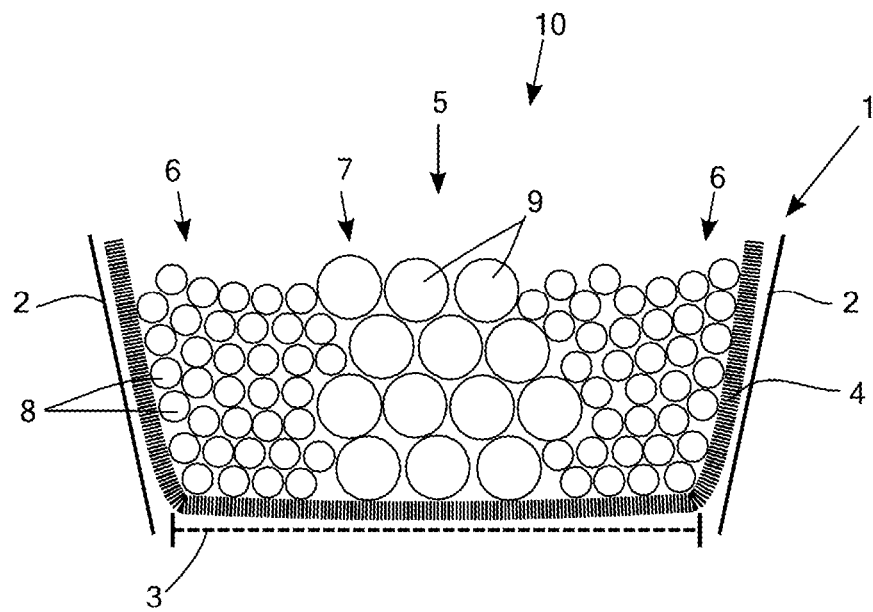
FIG. 1 is a sectional view of an example burner basket.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to raise the combustion efficiency and reduce the ammonia slip.

The object is achieved by a method for arranging a bed consisting of particles in a burner through which a gas can flow, more particularly in a burner basket of an ammonia oxidation burner, the particles being arranged such that the bed has a greater flow resistance in an edge region of the burner than in an inner region of the burner.

Proposed further for achieving the object is a burner basket for a burner, more particularly for an ammonia oxidation burner, having a bed consisting of particles, the particles being arranged such that the bed has a greater flow resistance in one edge region of the burner basket than in an inner region of the burner basket.

The arrangement of the particles is selected such that the bed has a greater flow resistance relative to the interior in the burner edge region that is susceptible to cavitation and/or gapping. The permeating gas is guided increasingly through the inner region of the reactor, thereby reducing the permeating gas loading on cavities present in the edge region, consequently reducing the development and expansion of cavities and gaps in the edge region. The destruction of the bulk-materials structure because of the difference in expansion characteristics between side walls and bottom plate, as a result of temperature fluctuations, is limited, and so there is an increase in combustion efficiency and reduction in ammonia slip.

The bed preferably has a greater bulk density in the edge region than in the inner region. As a result of the greater edge region bulk density, i.e., the greater mass of particles per unit volume in the edge region, the free space needed for the permeation of the gas between the particles in the edge region is reduced and the flow resistance in the edge region is increased. The higher bulk density contributes to restricting the freedom of movement of the particles in the edge region, thereby reducing the formation of cavities and/or gaps because of the expansion of the burner basket. In the inner region the bulk density is preferably set such that it is lower than in the edge region.

In one advantageous refinement, the bed comprises small particles and large particles, the small particles having a smaller diameter than the large particles. Through the use of particles of different diameters it is possible to adjust the flow resistance of the bed. It is possible to form regions which have essentially small particles, in order to set a high flow resistance, and regions which have essentially large particles, in order to set a low flow resistance. Furthermore, the large particles and small particles can be mixed in order to adjust the flow resistance.

In this context it has emerged as being particularly advantageous if the small particles have a diameter in the range from 1 mm to 10 mm, preferably in the range from 2 mm to 5 mm. A bed of small particles with diameters in the stated range has a high flow resistance.

The large particles preferably have a diameter in the range from 5 mm to 50 mm, preferably in the range from 10 mm to 40 mm, more preferably in the range from 20 mm to 30 mm. A bed of large particles having diameters in the stated range has a low flow resistance.

The ratio of the diameter of the small particles to the diameter of the large particles is preferably in the range from 1/50 to 1, more preferably in the range from 1/50 to 1/25.

In one preferred refinement, more small particles than large particles are arranged in the edge region and/or more large particles than small particles are arranged in the inner region. The preponderance of small particles in the edge region raises the bulk density and the flow resistance in the edge region. The preponderance of large particles in the inner region reduces the flow resistance in the inner region. With particular preference, small particles are arranged substantially in the edge region and/or large particles are arranged substantially in the inner region, so producing a maximum flow resistance in the edge region and/or a minimum flow resistance in the inner region.

According to an alternative refinement, more small particles than large particles are arranged in the edge region and in the inner region two layers are arranged, the lower layer having more small particles than large particles and the upper layer having more large particles than small particles. An arrangement of this kind for the particles allows the stability of the bed structure to be improved further.

In a further alternative refinement, in the edge region a mixture of small particles and large particles is arranged, and so the flow resistance in the edge region is set through the mixing ratio of the small particles and large particles. The mixing ratio can be set by means of a mixing apparatus to which small particles and large particles are supplied separately. The number of large particles and small particles in the mixture is preferably substantially the same.

Preference is given to the arrangement in the edge region of mutually superposed layers of large particles and of small particles. Large particles and small particles may be introduced in alternation into the edge region.

The width of the edge region preferably has a value in the range from 1% to 6% of the diameter of the burner and/or of the diameter of the burner basket. The width of the edge region is advantageously in the range from 5 cm to 30 cm, preferably in the range from 10 cm to 20 cm.

According to one advantageous refinement, a gas-permeable separation material to which the bed is applied is arranged on a bottom plate of the burner or of the burner basket. The gas-permeable separation material prevents the particles of the bed slipping through any openings in the bottom plate of the burner basket and/or through any gaps between the bottom plate and the side wall of the burner basket.

In one preferred refinement, a separating device is introduced into the burner or the burner basket and separates the edge region from the inner region. As a result of the separating device it is possible to prevent unwanted mixing of the edge region particles with the inner region particles. The separating device is preferably introduced into the burner or the burner basket before the particles of the bed are arranged in the edge region and/or in the inner region. The separating device may be removed from the burner or the burner basket after the bed has been introduced.

It has proven preferable for a gas-permeable separation material, more particularly a mesh, to be introduced between the edge region and the inner region. As a result of the gas-permeable separation material, mixing of the particles introduced into the edge region and the inner region can be prevented. The gas-permeable separation material is arranged preferably in the burner, more particularly in the burner basket, before the bed is introduced. With particular preference the design of the separation material is such that it is not permeable for small particles and large particles. The gas-permeable separation material can be introduced loose into the burner, more particularly into the burner basket, or anchored, for example to the bottom plate of the burner basket and/or to a separation material lying on the bottom plate. It is preferred, furthermore, for the gas-permeable separation material to be elastic, and so able to deform when the particles move. The gas-permeable separation material which is introduced between the edge region and the inner region may be formed from the same material as the gas-permeable separation material which is arranged on the bottom plate. The separation material separating the edge region and the inner region may remain in the burner during operation of the burner.

It is advantageous if the edge region has a rectangular, more particularly square, cross section. As a result of the rectangular, more particularly square, cross section, the stability of the structure of the bed in the edge region can be increased and the formation of depressions, cavities and/or gaps can be counteracted.

In an alternative refinement, the edge region has a trapezoidal cross section. A trapezoidal edge region is an advantage in those burners and/or burner baskets which are conical in design. The trapezium may be formed with an upward or downward taper.

The particles of the bed may be designed as packing elements, for example as Raschig rings, Pall rings, Berl, Interlox or Torus saddles and/or Interpack bodies. The material of the packing elements is preferably stoneware, porcelain, glass or stainless steel. Alternatively or additionally, the particles of the bed may have a catalyst. The bed accordingly may form a secondary catalyst, which increases the efficiency of the catalytic reaction. For example, the particles may be designed as packing elements which are impregnated with a catalyst, or as particles formed from a catalyst-comprising material. It is possible to use a mixture of particles formed of a non-catalyst-comprising material and particles formed of a catalyst-comprising material.

The advantageous features described above can be used in the case both of the method of the invention and of the burner basket of the invention, alone or in combination.

Further details, features and advantages of the invention are apparent from the drawings, and also from the description below of preferred embodiments with reference to the drawings. These drawings illustrate merely exemplary embodiments of the invention, which do not restrict the inventive concept.

In the various figures, identical parts are always provided with the same reference numerals, and are therefore in general only identified or mentioned once in each case as well. The drawings are schematic representations which serve to illustrate fundamental relationships. The representations are not true to scale and nor do they correctly reproduce the size relationships described.

FIG. 1 shows a burner basket 1 of a burner 10 formed as an ammonia oxidation burner, by means of which ammonia and oxygen are reacted catalytically to give nitrogen monoxide and water. The burner basket 1 has a substantially conical shape and, in operation of the burner 10, it is arranged in the interior of the burner 10, and so can be traversed by flows of ammonia and oxygen. The burner basket 1 is formed from a gas-permeable bottom plate 3 and side walls 2. In the case of the present exemplary embodiment, the gas-permeable bottom plate 3 and the side walls 2 are fixed independently of one another in the burner and are not directly joined to one another. Accordingly there is a gap between the gas-permeable bottom plate 3 and the side walls 2. Arranged above the bottom plate 3 is a gas-permeable separation material 4, which allows the passage of ammonia and oxygen and at the same time prevents particles falling through the gap between bottom plate 3 and side walls 2 or through the bottom plate 3.

Situated within the burner basket 1 is a bed 5 of particles which are in the form of packing elements 8, 9. In the figures, the packing elements 8, 9 are shown for simplification as substantially spherical particles, although particles of any predetermined form—as Raschig rings, Pall rings, Berl, Interlox or Torus saddles and/or Interpack bodies, for example, may constitute these elements, in deviation from the representation in the figures. The material of the packing elements is preferably stoneware, porcelain, glass or stainless steel. Arranged above the bed 5, not shown in the figures, may be a catalyst gauze, such as a platinum/rhodium catalyst gauze, for example. The particles may optionally have a catalyst material, and so the catalytic activity is enhanced.

In order to increase the combustion efficiency and to reduce the ammonia slip, the particles 8, 9 are arranged in such a way that the bed 5 has a greater flow resistance in an edge region 6 of the burner basket 1 than in an inner region 7 of the burner basket 1. As a consequence of the increased flow resistance in the edge region 6, the mixture of ammonia and oxygen is guided to an increased extent through the inner region 6 of the burner basket 1. The bed 5 has a greater bulk density in the edge region 6 than in the inner region 7. The higher bulk density in the edge region 6 contributes to restricting the freedom of movement of the particles 8 in the edge region 6, thereby reducing the formation of cavities and/or gaps because of thermally induced expansions of the bottom plate 3 and/or of the side walls 2.

As is also apparent from the representation in FIG. 1, the bed 5 comprises small particles 8 and large particles 9, the small particles 8 being smaller in form than the large particles 9. The diameter of the small particles 8 is in the range from 1 mm to 10 mm and is smaller than the diameter of the large particles 9, which is in the range from 5 mm to 50 mm.

Substantially small particles 8 are arranged in the edge region 6 of the burner basket 1, while substantially large particles are arranged in the inner region 7. Accordingly in the edge region 6 there is a preponderance of small particles and in the inner region 7 there is a preponderance of large particles. The edge region 6 has a width which is between 1% and 6% of the diameter of the burner.

Figure 2:
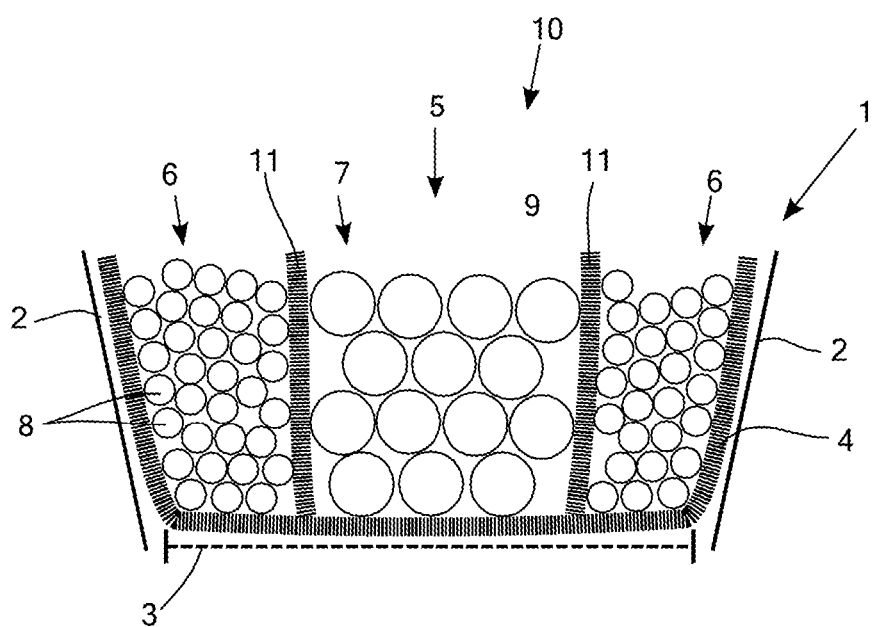
FIG. 2 is a sectional view of another example burner basket.

FIG. 2 shows a second exemplary embodiment of a burner basket 1 of the invention. Fundamentally, the burner basket 1 has a construction similar to that of the burner basket of the first exemplary embodiment, and so what was said there is also valid for the second exemplary embodiment. In contrast to the burner basket 1 of the first exemplary embodiment, the burner basket 1 according to FIG. 2 additionally has a gas-permeable separation material 11 which is arranged between the edge region 6 and the inner region 7. The gas-permeable separation material 11 is designed as an elastic mesh which is able to deform on expansion of the burner basket 1, as a result of the heating thereof, thereby removing a risk of damage to the gas-permeable separation material 11 as a result of the movement of the particles 8, 9.

Figure 3:
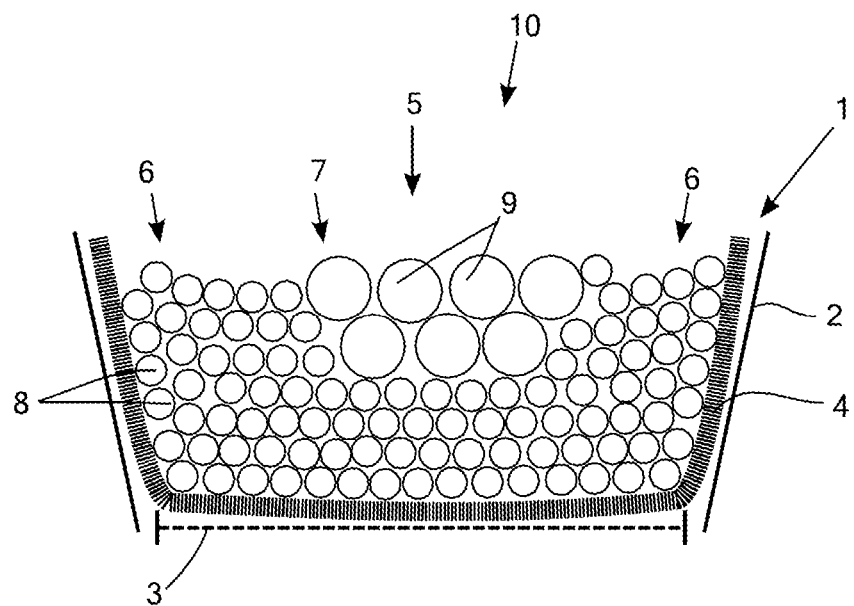
FIG. 3 is a sectional view of still another example burner basket.

FIG. 3 shows a third exemplary embodiment of a burner basket 1 according to the invention. The burner basket 1 of the third exemplary embodiment corresponds to the burner basket 1 of the first exemplary embodiment, with the difference that the arrangement of the particles in the inner region 7 of the burner basket 1 is different. According to FIG. 3, there are two layers arranged in the inner region 7, with the lower layer having more small particles 8 than large particles 9 and the upper layer having more large particles 9 than small particles 8. In the edge region 6 there are more small particles 8 than large particles 9 arranged. As a result, the stability of the bed 5 is improved relative to the bed 5 of the first exemplary embodiment.

Figure 4:
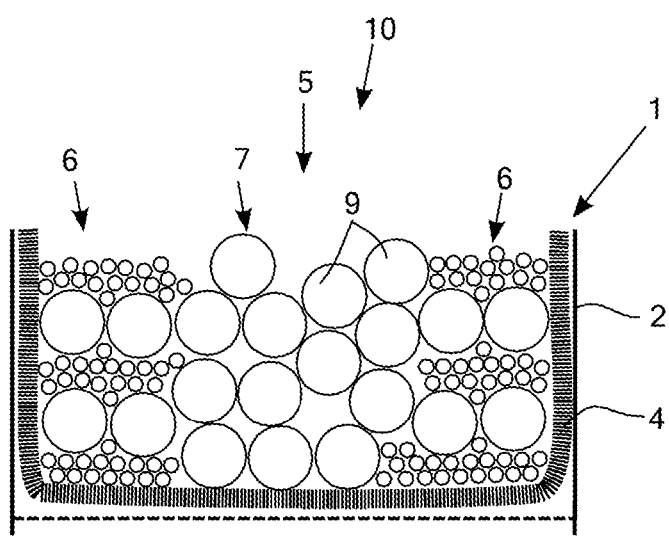
FIG. 4 is a sectional view of yet another example burner basket.

The representation in FIG. 4 shows a fourth exemplary embodiment of a burner basket 1 of the invention. In comparison to the preceding exemplary embodiments, the basic form of the burner basket 1 according to FIG. 4 is cylindrical. The side walls 2 are arranged substantially at a right angle to the bottom plate 3. Moreover, the side walls 2 are joined directly to the bottom plate 3.

Since the side walls 2 run substantially vertically, the edge region 6 has a rectangular, more particularly square, cross section. Arranged in the edge region 6 is a mixture of small particles 8 and large particles 9. The particles 8, 9 of the bed 5 are arranged in layers in the edge region 6, each layer having essentially small particles 8 or large particles 9.

Figure 5:
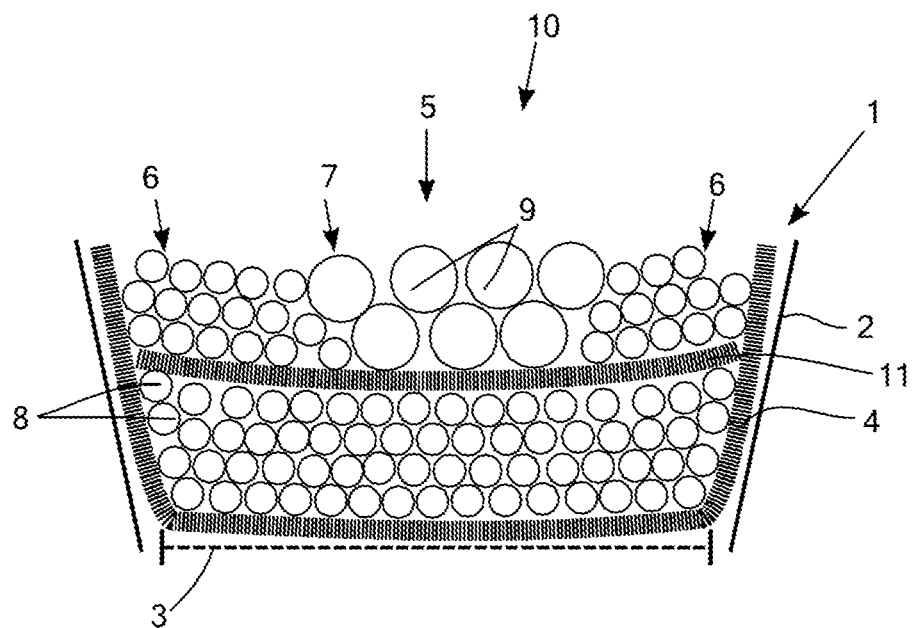
FIG. 5 is a sectional view of another example burner basket.

FIG. 5 shows a fifth exemplary embodiment of a burner basket 1. The burner basket 1 corresponds essentially to the burner basket 1 shown in FIG. 3, with the difference that a separation material 11 in the form of a separation mesh is introduced in order to separate the large particles 9 from the small particles 8. The separation material 11 is arranged between a lower layer, which consists of small particles 8, and an upper layer, which consists of large particles 9.

Figure 6:
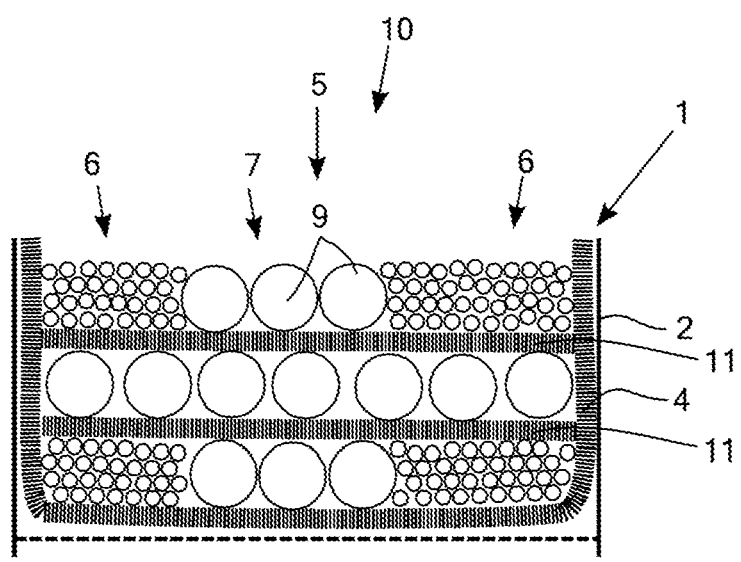
FIG. 6 is a sectional view of an example burner basket.

FIG. 6 shows a sixth exemplary embodiment of a burner basket 1, which corresponds essentially to the burner basket 1 shown in FIG. 4. For the separation of the large particles 9 from the small particles 8, a plurality of separation materials 11 in the form of separation meshes are introduced into the burner basket 1. The separation meshes are arranged substantially horizontally, and separate a layer consisting of large particles 9 from the bordering layers, which comprise large particles 9 and small particles 8.

Figure 7:
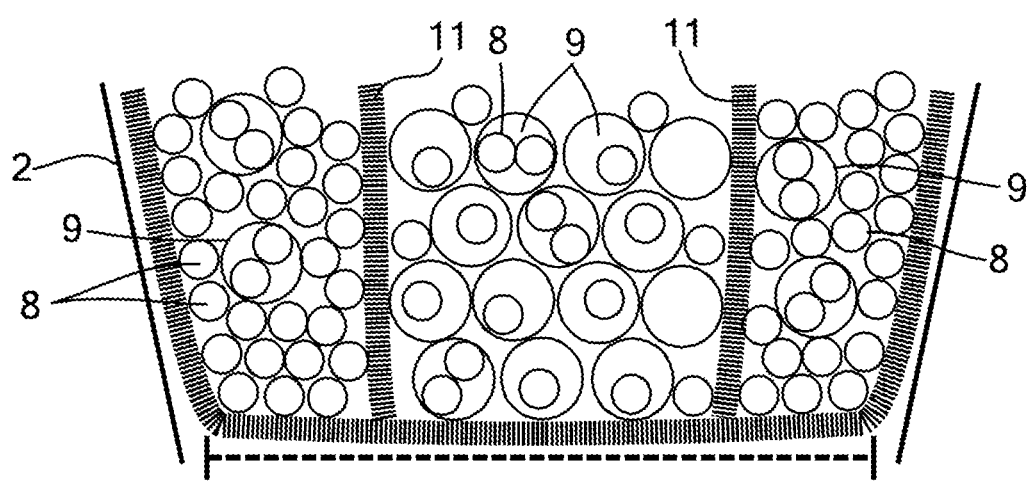
FIG. 7 is a sectional view of another example burner basket.

The representation in FIG. 7 shows a seventh exemplary embodiment of a burner basket 1, which has a bed 5 having in the edge region 6 an increased flow resistance relative to the inner region 7. For this purpose, a mixture of small particles 8 and large particles 9 is introduced in the burner basket 1, there being fewer large particles 9 per unit volume arranged in the edge region 6 than in the inner region 7, so producing a mixture of higher bulk density in the edge region 6. The number of small particles 8 per unit volume is greater in the edge region 6 than in the inner region 7.

The small particles 8 are formed of a catalyst material, while the large particles 9 consist of ceramic. The large particles 9 are designed as Raschig rings. The size selected for the Raschig rings is such that the small particles 8 are able to penetrate the cylindrical cavity formed by the Raschig rings. This brings with it the advantage that the small particles 8 are held by the large particles 9 in the form of Raschig rings in the edge region 6, thereby reducing the risk of the blowing of the small particles 8 from the edge region 6 in the direction of the inner region 7. Arranged between the edge region 6 and the inner region 7 there are, additionally, separation meshes 11 made from a gas-permeable material, so making it more difficult for unwanted migration of the small particles 8 from the edge region 6 into the inner region 7 to take place.

A first refinement of the method of the invention for arranging a bed 5 in a burner 10 through which a flow of gas may pass will be elucidated below with reference to the representations in FIG. 8.

Figure 8A:
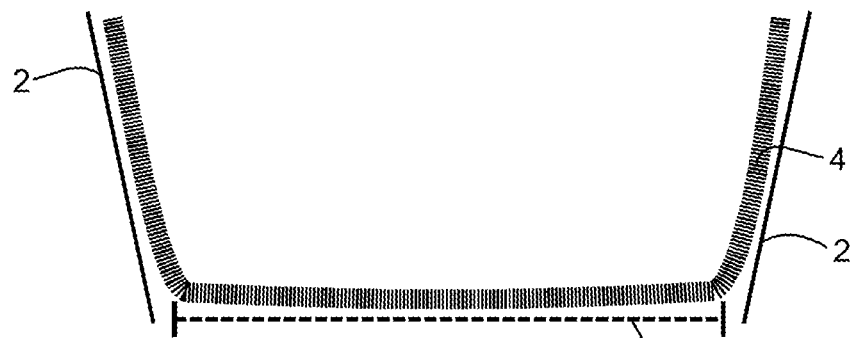
FIG. 8a is a sectional view the example burner basket of FIG. 1 wherein a gas-permeable separation material is disposed on a bottom plate.

As shown in FIG. 8a, a gas-permeable separation material 4, for example in the form of a mesh, is first of all arranged on the bottom plate 3. The separation material 4 may be arranged in such a way that it protrudes beyond the bottom plate 3 at the sides and bears against the side walls 2.

Figure 8B:
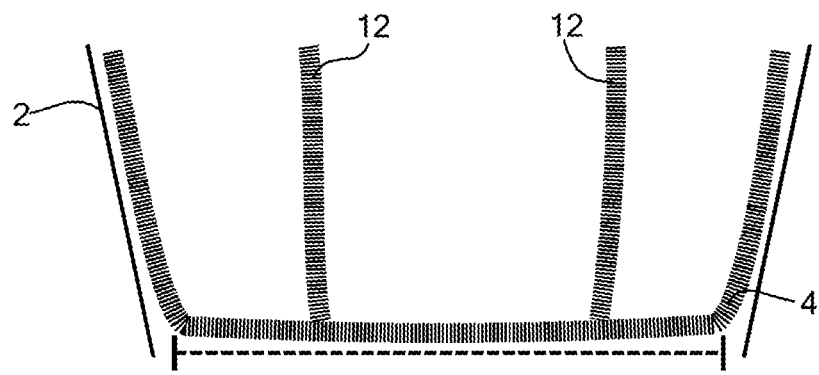
FIG. 8b is a sectional view of the example burner basket of FIG. 1 wherein a separating device has been introduced into the example burner basket.
Figure 8C:
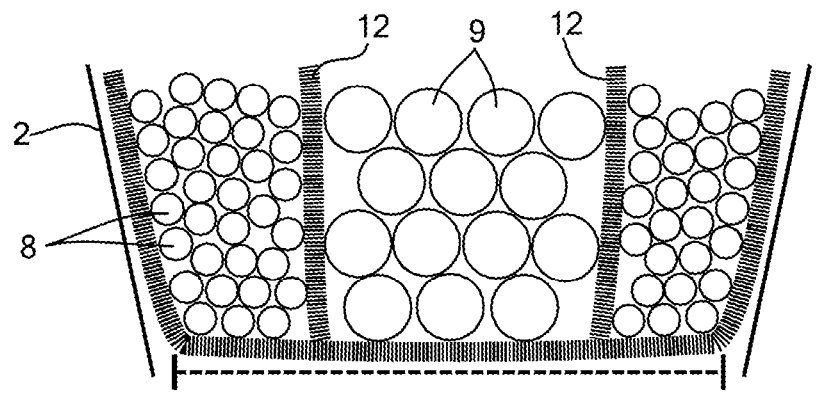
FIG. 8c is a sectional view of the example burner basket of FIG. 1 wherein particles of a bed are disposed such that the bed has a greater flow resistance in an edge region than in an inner region.

In a further step, which is shown in FIG. 8b, a separating device 12 is introduced into the burner basket 1. The separating device has at least one separating wall which separates the inner region 7 from the outer region 6 of the burner basket 1. The separating device 12 may be designed, for example, in the manner of a cylindrical pipe.

When the separating device 12 has been introduced into the burner 10, the bed 5 is introduced into the burner basket 1 of the burner 10. As is apparent from FIG. 8c, the particles 8, 9 of the bed 5 are arranged in this case such that the bed 5 has a greater flow resistance in the edge region 6 of the burner basket 1 than in an inner region 7 of the burner basket 1. The edge region 6 is filled with more small particles 8 than large particles 9. In the inner region 7 there are more large particles 9 than small particles 8 introduced.

After the introduction of the bed 5 into the burner basket 1, the separating device 12 is removed from the burner basket 1. The particles 8, 9 fill the space vacated by the separating device 12, and an arrangement is produced as shown in FIG. 1.

Lastly it is possible for a catalyst gauze to be placed onto the bed 5.

A further refinement of the method of the invention is described below with reference to the representation in FIG. 9.

Figure 9A:
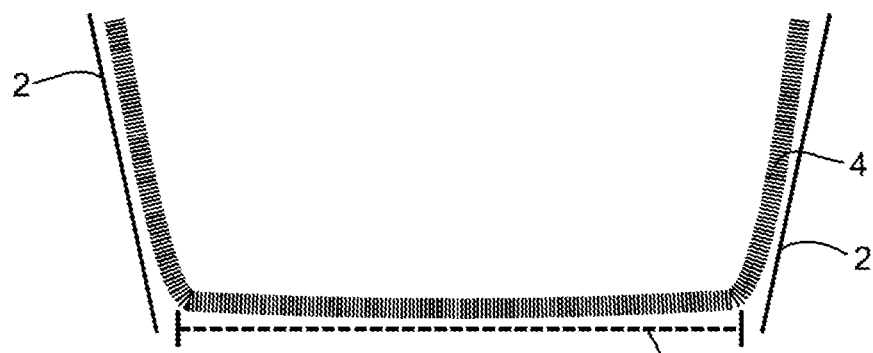
FIG. 9a is a sectional view of the example burner basket of FIG. 2 wherein a gas-permeable separation material is disposed on a bottom plate.

As shown in FIG. 9a, a gas-permeable separation material 4, in the form of a mesh, for example, is first of all arranged on the bottom plate 3. The separation material 4 may be arranged in such a way that it protrudes laterally beyond the bottom plate 3 and bears against the side walls 2.

Figure 9B:
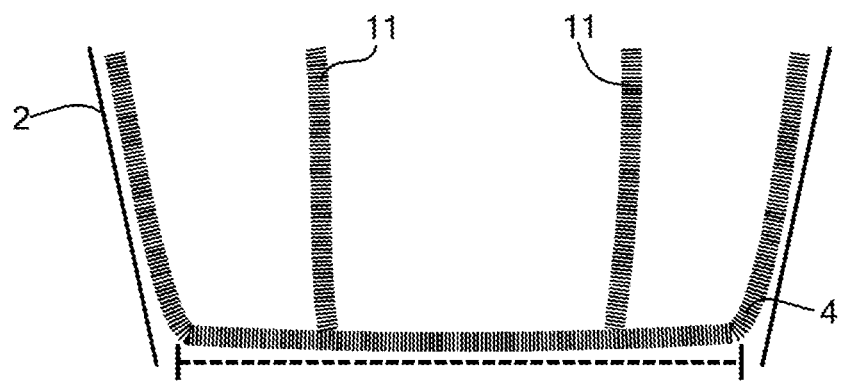
FIG. 9b is a sectional view of the example burner basket of FIG. 2 wherein a gas-permeable separation material is disposed in a region between an edge region and an inner region of the burner basket.
Figure 9C:
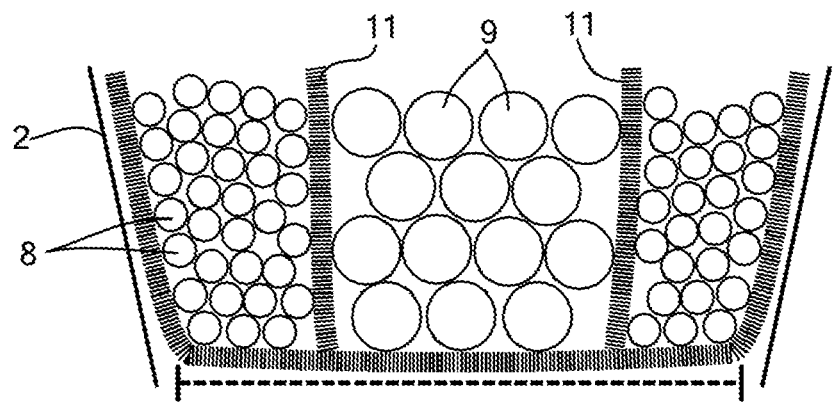
FIG. 9c is a sectional view of the example burner basket of FIG. 2 wherein particles of a bed are disposed such that the bed has a greater flow resistance in an edge region than in an inner region.

As shown in FIG. 9b, in a subsequent method step, at least one gas-permeable separation material 11 is arranged in the region between the edge region 6 and the inner region 7 of the burner basket 1. The gas-permeable separation material 11 is preferably joined to the gas-permeable separation material 4 lying on the bottom plate 3.

When the gas-permeable separation material 11 has been introduced into the burner basket 1, the bed 5 is introduced into the burner basket 1 of the burner 10. As is apparent from FIG. 9c, the particles 8, 9 of the bed 5 are arranged in this case such that the bed 5 has a greater flow resistance in the edge region 6 of the burner basket 1 than in an inner region 7 of the burner basket 1. In the edge region 6, there are more small particles 8 introduced than large particles 9. In the inner region 7, there are more large particles 9 introduced than small particles 8.

Lastly a catalyst gauze can be placed onto the bed 5.

With the above-described method for arranging a bed 5, consisting of particles 8, 9, in a burner 10 through which a flow of gas may pass, more particularly in a burner basket 1 of an ammonia oxidation burner, the particles 8, 9 are arranged in such a way that the bed 5 has a greater flow resistance in an edge region 6 of the burner 10, than in an inner region 7 of the burner 10. As a result of this, the combustion efficiency is increased and the ammonia slip is reduced.

LIST OF REFERENCE NUMERALS

1 Burner basket
2 Side wall
3 Bottom plate
4 Separation material
5 Bed
6 Edge region
7 Inner region
8 Small particles
9 Large particles
10 Burner
11 Separation material
12 Separating device

What is claimed is:

1. A method for disposing a bed comprising particles in a burner basket through which a gas can flow, the method comprising:
   positioning a gas-permeable separation material within the burner basket between an inner region and an edge region; and
   disposing the particles in the inner region and the edge region such that a flow resistance of the bed is greater at the edge region of the burner basket than at the inner region of the burner basket,
   wherein the burner basket is an ammonia oxidation burner basket.

2. The method of claim 1 wherein the bed has a greater bulk density in the edge region than in the inner region.

3. The method of claim 1 wherein the bed comprises small particles and large particles, wherein the small particles have a smaller diameter than the large particles.

4. The method of claim 3 wherein the small particles have a diameter in a range from 1 mm to 10 mm.

5. The method of claim 4 wherein the large particles have a diameter in a range from 5 mm to 50 mm.

6. The method of claim 5 wherein more of the small particles than the large particles are disposed in the edge region of the burner basket, wherein more of the large particles than the small particles are disposed in the inner region of the burner basket.

7. The method of claim 5 wherein more of the small particles than the large particles are disposed in the edge region, wherein two layers of particles are disposed in the inner region, wherein a lower layer of the two layers has more of the small particles than the large particles and an upper layer of the two layers has more of the large particles than the small particles.

8. The method of claim 5 comprising disposing a mixture of the small particles and the large particles in the edge region.

9. The method of claim 5 comprising disposing mutually superposed layers of the large particles and the small particles in the edge region.

10. The method of claim 5 wherein a width of the edge region of the burner basket has a value in a range from 1% to 6% of a diameter of the burner basket.

11. The method of claim 1 wherein the gas-permeable separation material to which the bed is applied is further disposed on a bottom plate of the burner basket.

12. The method of claim 1 wherein the edge region has a rectangular cross section or a trapezoidal cross section.

13. The method of claim 1 wherein the particles of the bed at least one of
 a catalyst, or
 are configured as packing elements.

14. A burner basket for a burner, the burner basket comprising:
 a gas-permeable separation material disposed within the burner basket between an inner region and an edge region; and
 a bed of particles disposed in the burner basket such that a flow resistance of the bed is greater in the edge region of the burner basket than in the inner region of the burner basket,
 wherein the burner basket is configured for an ammonia oxidation burner, wherein the gas-permeable separation material to which the bed is applied is further disposed on a bottom plate of the burner basket.

15. The burner basket of claim 14 wherein the bed comprises small particles and large particles, wherein the small particles have a smaller diameter than the large particles, wherein the small particles have a diameter in a range from 1 mm to 10 mm, wherein the large particles have a diameter in a range from 5 mm to 50 mm.

16. The burner basket of claim 15 wherein more of the small particles than the large particles are disposed in the edge region, wherein two layers of particles are disposed in the inner region, wherein a lower layer of the two layers has more of the small particles than the large particles and an upper layer of the two layers has more of the large particles than the small particles.

* * * * *